Dec. 12, 1944.    S. G. ESKIN    2,364,841

THERMOMETER

Filed April 24, 1942

INVENTOR.
SAMUEL G. ESKIN.
BY
Albert J. Henderson
ATTORNEY.

Patented Dec. 12, 1944

2,364,841

UNITED STATES PATENT OFFICE 2,364,841

THERMOMETER

Samuel G. Eskin, Pittsburgh, Pa., assignor to American Thermometer Company, St. Louis, Mo., a corporation of Delaware Application April 24, 1942, Serial No. 440,282

1 Claim. (Cl. 73—352)

This invention relates to thermometers and, more particularly, to those adapted to indicate the temperature of roasting meat.

Thermometers of this general type have one end arranged for insertion in the meat being roasted with the other end projecting therefrom and carrying the scale or other temperature indicating means. These thermometers may be of the glass stem and bulb type containing liquid, or of the non-liquid type using bimetal or other thermosensitive means, but their method of use is the same in that the entire instrument is located within the oven where the meat is being roasted. Such devices are inconvenient to use since it is necessary to open the oven door to read the temperature which they indicate. Moreover, the temperature indicating means is difficult to read, particularly after exposure to burning fats or grease within the oven.

It is an object of this invention to facilitate reading of a roast meat thermometer.

Another object of the invention is to make it unnecessary to open the oven door to take the temperature of meat being roasted therein.

Another object of the invention is to render the thermometer permanently available and not subject to loss or misplacement.

Another object of the invention is to avoid obscuring the thermometer scale by burning fats or grease and to maintain it clean and legible.

Other objects and advantages will become apparent from the following description taken in connection with the accompanying drawing, wherein.

Figure 1:
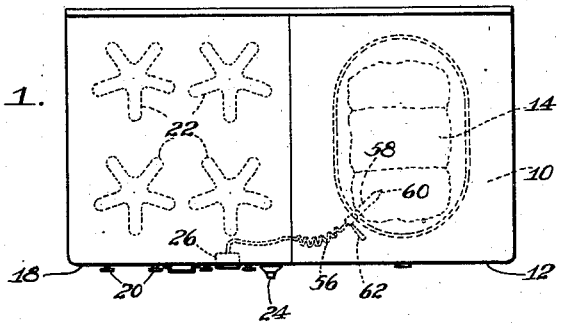
Fig. 1 is a plan view of a gas range having the invention applied thereto.
Figure 2:
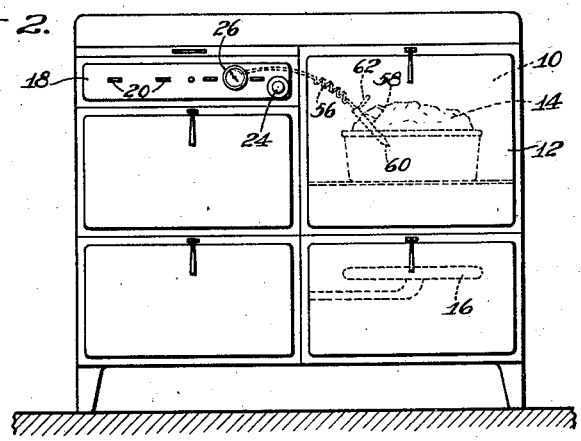
Fig. 2 is a front elevation of the same.

Referring more particularly to the drawing, the gas range has an oven compartment 10 provided with an oven door 12 which may be opened and closed to provide access to the meat 14 being roasted therein by the heat from the burner 16. At one side of the oven compartment 10 is located the front panel 18 of the gas range which carries the operating handles 20 of the burner cocks (not shown) controlling flow of fuel to the top burners 22 and also the usual thermostat 24 for regulating the temperature of the oven compartment 10. The gas range shown and thus briefly described is purely exemplary and it will be understood that ranges of other constructions may be adapted for use with this invention, if desired.

Figure 3:
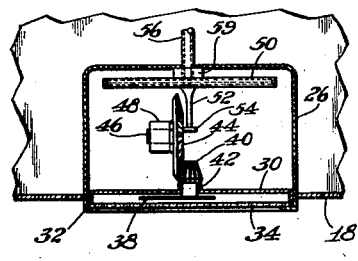
Fig. 3 is an enlarged plan view, partly in section, of the temperature indicating portion of the thermometer.
Figure 5:
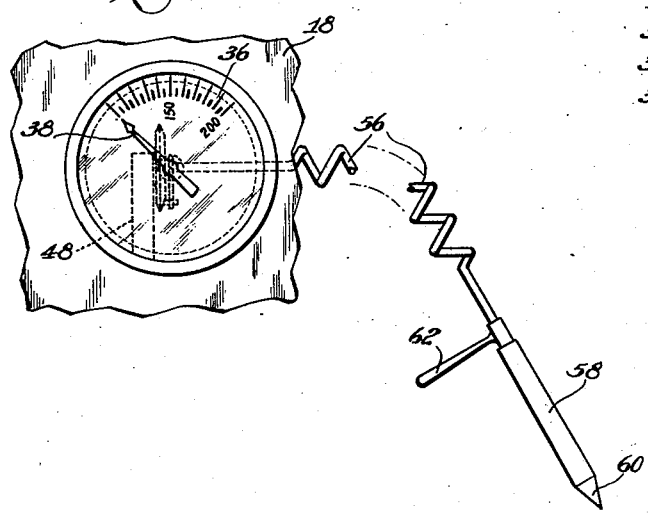
Fig. 5 is an enlarged front elevation of the invention with the adjacent parts of the gas range broken away.
Figure 4:
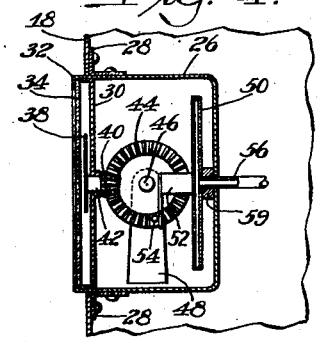
Fig. 4 is a side elevation, partly in section, of the same.

The thermometer for use on the range described comprises a casing 26, shown more clearly in Figs. 3 and 4, which is mounted by means of the brackets 28 on the rear side of the front panel 18 of the range. The front panel 18 is provided with an opening through which a portion of the casing 26 may project and carry a dial 30 exposed to view on the front side of the panel. The projecting end of the casing has a bezel 32 and protecting crystal 34 for the dial 30, the latter being suitably marked with temperature graduations 36 forming the temperature scale. A pointer 38 located between the dial and crystal cooperates with the temperature graduations 36 as will hereinafter be apparent.

The actuating means for the pointer 38 may comprise a bevel pinion 40 to which the pointer is fastened and which is journaled in a bearing 42 formed on the rear side of the dial 30 within the casing 26 concentric therewith. The pinion 40 meshes with a bevel gear 44 carried by a pin 46 journaled in a support 48 projecting from a side wall of the casing 26. Rotation of the gear 44 is effected by an actuating element 50 supported on the rear wall of the casing 26 in axial alignment with the pinion 40 and carrying an angular arm 52 which engages with an abutment in the form of a pin 54 projecting from the toothed portion of the gear 44. The arrangement described serves to amplify the small movements of the actuating element 50 and move the pointer in an arcuate path across the scale. It is apparent that other mechanism could be used to perform this function as well as the gearing and associated parts.

The actuating element 50 forms part of an hydraulic operating unit of well-known form but structurally modified for the purposes of this invention. Such units consist generally of a hollow diaphragm similar to the actuating element 50 which is connected by capillary tubing 56 to a bulb 58 and forming a closed system. The system is completely filled with a suitable fluid which will expand and contract in response to temperature changes at the bulb 58 and cause corresponding expansion and contraction of the actuating element 50. In adapting such units for the purposes of this invention the bulb 58 need be of an overall length no greater than one inch and the actuating element 50 may be approximately ⅝" in diameter. The dimensions of the bulb and actuating element are chosen to give a deflection of approximately .003" per 100° Fahrenheit temperature change at the bulb when the unit is filled with a fluid such as chlorinated diphenyl. This small deflection, when amplified by means such as those shown in this exemplary embodiment, is sufficient to cause movement of the pointer 38 over a range from 100° to 200° Fahrenheit as indicated on the dial 30. It will be understood that the invention is not limited to the use of fluids of the type described or to the specified dimensions for the structural parts and that the temperature indications may be modified accordingly, without departing from the spirit of this invention.

The capillary tubing 56 extends from the actuating element 50 through the rear wall of the casing 26, there being a grommet 59 or other reinforcement on the casing at this point to which the element 50 may be attached. The tubing 56 is preferably coiled to lend considerable flexibility thereto and is of sufficient length to extend through the partition wall between the top burner 22 and oven compartments 10 of the gas range so that the end of the bulb 58 may readily be inserted into the roast 14 in the oven compartment. To facilitate such insertion a skewer point is provided on the end of the bulb 58 which will readily penetrate the meat. The filling of the bulb 58 with the fluid actuating medium may be accomplished by providing the bulb 58 with a hollow member 62 adjacent its junction with the capillary tubing 56. The hollow member 62 may be welded or otherwise secured to the bulb 58 and the open end sealed against leakage after the filling operation, thus providing an operating handle to assist insertion of the bulb into the meat. Preferably, the bulb 58 and the capillary tubing 56 are made of stainless steel to eliminate possibility of corrosion and to allow easy cleaning of these parts.

In using the thermometer of this invention, it is only necessary to open the oven door 12, place the meat 14 therein in the usual manner and then insert the bulb 58 into the meat. The oven door 12 may then be closed and the cooking operation proceed in the usual manner under control of the thermostat 24. The large dial 30 of the thermometer renders the temperature reading easy and convenient and there is no necessity for opening the oven door 12 to ascertain the temperature of the roast 14. When the roasting is completed, the oven door 12 may be opened and the bulb 58 withdrawn from the meat which can then be removed from the oven compartment 10. As the thermometer of this invention is permanently installed and is not withdrawn with the roast 14, it cannot be lost or misplaced and is always available for another roasting operation.

I claim:

A thermometer comprising in combination, an indicating instrument including a scale and pointer and an expansible element for operating said pointer, a bulb having a skewer point at one end, a flexible tubing connecting the opposite end of said bulb to said expansible element, a fluid actuating medium in said bulb, and a hollow member secured to said bulb adjacent the junction of said flexible tubing, said hollow member providing an operating handle and a filling opening for said fluid.

SAMUEL G. ESKIN.